United States Patent Office 3,574,086
Patented Apr. 6, 1971

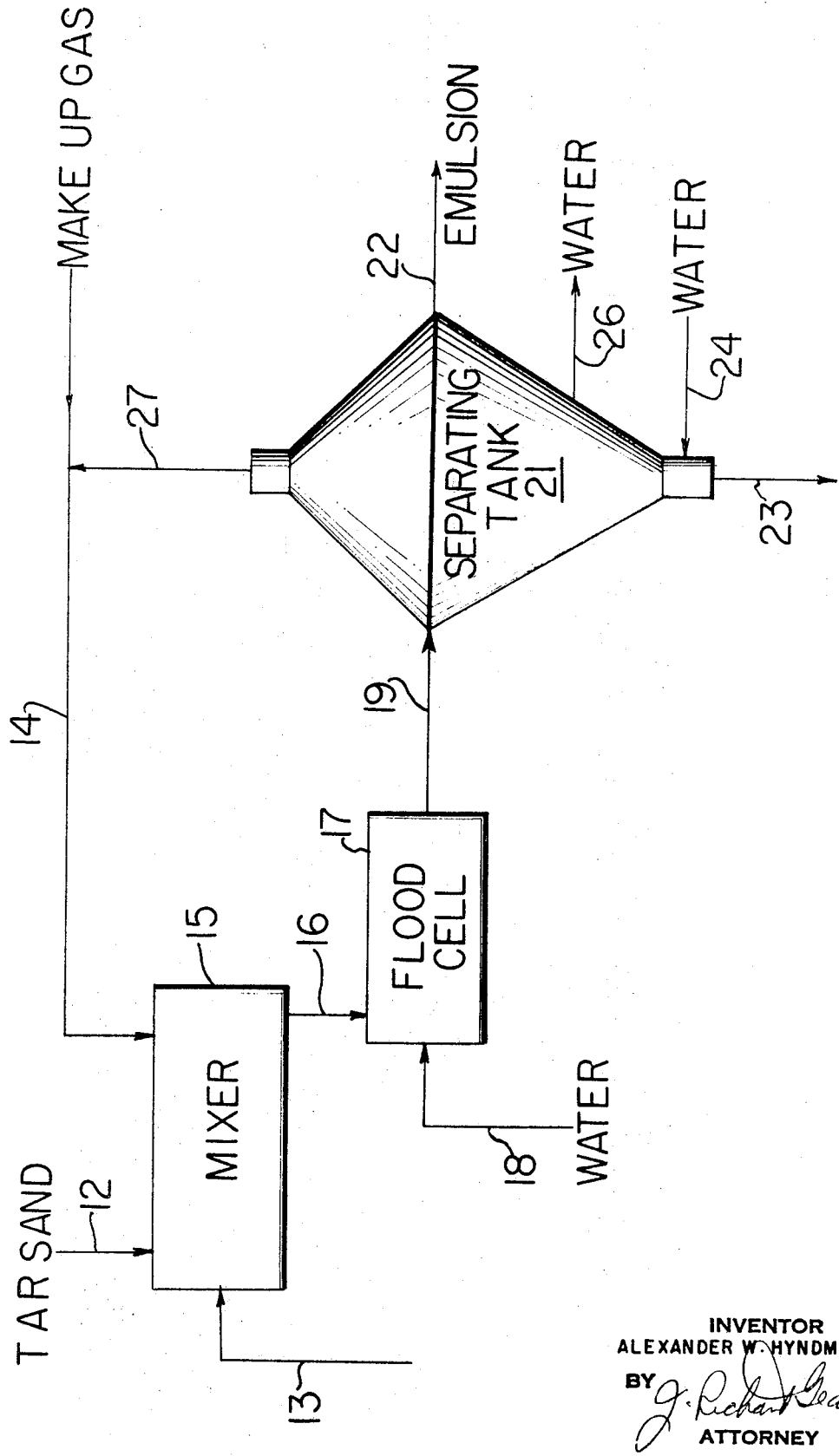

3,574,086
RESTORATION OF LIGHT HYDROCARBON
GASES TO TAR SAND
Alexander W. Hyndman, Edmonton, Alberta, Canada, assignor to Cities Service Athabasca, Inc., Imperial Oil Limited, Atlantic Richfield Corporation, and Royalite Oil Company, Limited, fractional part interest to each
Filed Aug. 28, 1968, Ser. No. 755,975
Int. Cl. C07g 1/04
U.S. Cl. 208—11   7 Claims

ABSTRACT OF THE DISCLOSURE

Bitumen is recovered from bituminous sand containing the same by forming a slurry of bituminous sand and water in a gaseous hydrocarbon atmosphere. The aqueous slurry, which contains entrained and dissolved gaseous hydrocarbons, is then introduced into a body of hot water so that bitumen rises to the top in the form of a bituminous emulsion while sand settles to the bottom. The gaseous hydrocarbon atmosphere is preferably maintained throughout the process and between about 0.05 and about 5 wt. percent hydrocarbon gas based upon bitumen content of the slurry is preferably contained in the slurry.

---

Large deposits of bituminous sand are found in various localities throughout the world. The term "bituminous sand" is used herein to include those materials commonly referred to as oil sand, tar sand and the like. One of the most extensive deposits of bituminous sand occurs, for instance, in the Athabasca District of the Province of Alberta, Canada.

Typically, these sands contain from about 6% to about 20% of bitumen (also referred to herein as oil), from about 1% to about 10% of water, and from about 70% to about 90% of mineral solids. The specific gravity of the bitumen varies from about 1.0 to about 1.05 and the bitumen has an API gravity of about 8.0 degrees. This value for specific gravity as well as that of the specific gravity of any other material given herein is taken at 60° F. All percentage values are on a weight basis unless otherwise specified.

The major portion, by weight, of the mineral solids in bituminous sand is quartz sand having a particle size greater than about 45 microns and less than 2,000 microns. The term "mineral" is used herein to describe material of inorganic origin such as sand, clay and the like as distinguished from material of organic origin such as coke. For the most part, the remaining mineral solid material has a particle size of less than about 45 microns. This smaller-size mineral solid material is referred to as "fines." The fines contain clay and silt including some very small particles of sand. The fines content typically varies from about 10% to about 30% by weight of the total solid mineral content of bituminous sand. However, it is not uncommon for the ingredients of bituminous sand to vary from the above-mentioned concentrations.

Various methods are known for separating bitumen from bituminous sand. Some of these methods involve the use of water for preparing a slurry at a temperature above about 75° F. Most of the coarse sand and portions of the fines are separated from the slurry by various means, such as settling in a body of water, to recover an emulsion, or froth, which contains some of the fines and quantities of coarse sand. Such an emulsion or froth is referred to herein as a bituminous emulsion.

One well-known method for preparing such emulsions is often referred to as the "hot-water process." In the hot-water process, the bituminous sand is slurried with steam and hot water and the pulp is then agitated with a stream of circulating hot water and carried to a separation cell maintained at an elevated temperature of about 180° F. In this separation cell, entrained air causes the bitumen to rise to the top of the cell in the form of an emulsion containing air, bitumen, water and mineral solids. The mineral solids are extremely difficult to separate from the bitumen and, unless the emulsion is further treated, it will generally contain at least 5% of mineral solids. This bituminous emulsion or froth can be subjected to water washing to effect a partial reduction in solids.

A bituminous emulsion, such as that obtained by the above-described procedures, often contains from about 10% to about 60% water, 5% to about 20% of mineral solids and from about 30% to about 85% bitumen. Usually, however, the bituminous emulsion or froth will contain, by weight, from about 25% to about 50% water, about 5% to about 12% mineral solids and about 35% to about 70% of bitumen.

Separation of water and mineral solids from the bituminous emulsion is necessary for most ultimate uses of the bitumen. A number of methods have been proposed for breaking bituminous emulsions and recovering the bitumen. One such method involves the use of thermal dehydration followed by cycloming as described in U.S. Pat. 3,338,814 to R. A. Given et al.

It has now been found that processes such as those described above for recovery of bitumen from fluid slurries of bituminous sand may be improved if the slurry is initially formed in a gaseous hydrocarbon atmosphere rather than in a conventional air atmosphere. By forming the slurry in the presence of gaseous hydrocarbons, the gaseous hydrocarbons are entrained and dissolved in the slurry. Hydrocarbon gases have been found to be more effective than air in obtaining an efficient recovery of bitumen in processes such as those described above.

The accompanying drawing is a somewhat diagrammatic illustration of a suitable arrangement of apparatus for carrying out a preferred embodiment of the invention.

In practicing the present invention, it is important that the initial slurry be formed in an atmosphere which contains little, if any, oxygen. The atmosphere in which the slurry is formed, preferably contains at least about 70 volume percent hydrocarbon gases and less than 5 volume percent oxygen. Thus, substantially all of the gas entrained and dissolved in the slurry during its formation is hydrocarbon gas rather than inert gases or oxygen. While the reasons for the advantages gained by the use of hydrocarbon gas rather than air are not completely understood, it is believed that the substantial exclusion of oxygen from the system prevents oxidation of bitumen to organic surfactants as well as preventing the oxidation of inorganics and the absorpton of oxygen on inorganics (which increases their floatability and thereby contamination of the resulting bituminous froth with such inorganic material). Since most of the gas entrained or dissolved in the slurry is introduced into the slurry during its initial formation, this is the stage of the process at which it is most important that gaseous hydrocarbon atmosphere rather than a conventional air atmosphere be employed. However, it is also preferred that a gaseous hydrocarbon atmosphere be maintained until the slurry has been introduced into the body of water for separation of bitumen therefrom.

While the present invention may be practiced at atmospheric pressures, it is sometimes convenient to operate under slightly increased pressures or to maintain a pressure differential between the slurrying step and the separation step. Pressures of one to two atmospheres are normally considered desirable for the slurrying step and where it is desired to maintain a pressure differential to assist in flotation of bitumen in the separation step, the body of water in the separation zone may conveniently be maintained under a pressure between about 0 and about 20 p.s.i. lower than the pressure of the gaseous hydrocarbon atmosphere in the slurrying step.

While any hydrocarbons which are gaseous under the operating conditions of the process may be used, the normally gaseous hydrocarbons, i.e. those which are gaseous at a pressure of one atmosphere and a temperature of 60° F., such as ethane, methane and propane, are preferred. The slurrying is preferably carried out under conditions such that between about 0.05 and 5 wt. percent gaseous hydrocarbons based on bitumen is dissolved or entrained in the slurry and is contained in the slurry when the slurry is introduced into the body of water for recovery of bitumen therefrom.

The process of the present invention may be carried out under any of the temperature conditions considered normal to such operations but it is preferred that slurrying temperatures be between about 60 and about 200° F. while the temperature of the body of water in the separation zone is preferably maintained between about 100 and about 190° F.

While the slurry of bituminous sand may be formed in whole or in part using liquid hydrocarbons, water is preferred as the slurrying fluid. Likewise, the amount of water used in forming the slurry may vary widely but enough water is preferably used so that the slurry introduced into the separation zone contains between about 15 and about 50 wt. percent water. In accordance with conventional practice the water content of the slurry may all be added during the slurrying step or a part of the water such as up to about 25 wt. percent based on slurry may be added during the slurrying step and the remainder of the water added in a separate flooding step prior to introduction of the slurry into the body of water for separation of bitumen therefrom.

Referring now to the drawing, bituminous sand entering through a conduit 12, hot water entering through a conduit 13 and gaseous hydrocarbons entering through a conduit 14 are mixed in a closed mixer 15 to form a slurry. In accordance with the invention, the gaseous hydrocarbons forms the atmosphere in which the slurrying takes place and air is substantially excluded. Temperature of the slurry may be controlled in any suitable manner such as by varying the temperature of the water introduced through the conduit 13 or introducing steam along with the water as needed.

From the mixer 15, the slurry may be passed through a conduit 16 to a flood cell 17 in which additional flooding water entering as through a conduit 18 is mixed with the slurry to increase the water content thereof. From the flood cell 17, the flooded slurry is passed through a conduit 19 to a separating tank 21 containing a body of hot water into which the slurry is introduced. In the separating tank 21, bitumen rises to the top of the body of water in a form of a bituminous froth or emulsion which may be withdrawn as through a conduit 22 while sand settles to the bottom and may be removed as through a conduit 23. As is conventional in such processes, water may be introduced through a conduit 24 to wash sand prior to its removal from the separating tank and a side stream of water may be removed through a conduit 26 and may, if desired, be recycled to the mixing step or treated for recovery of bitumen or solids therefrom.

The hydrocarbon gas entrained and dissolved in the slurry aids in floating the bitumen as described immediately above and a portion of such gas may become dissolved or entrained in the froth or emulsion removed through the conduit 22. The remainder of the gas is preferably recovered as through a conduit 27 and may be recycled through the conduit 14 together with fresh makeup gas as needed for use in the mixer 15. The emulsion recovered through the conduit 22 may, of course, be treated by any suitable means for recovery of bitumen therefrom and hydrocarbon gases dissolved or entrained in the emulsion may, if desired, be recovered in a conventional manner and recycled through the conduit 14 for reuse in the process.

EXAMPLE

In this example, bituminous sand containing 11 wt. percent bitumen, 5 wt. percent water and 84 wt. percent solids is introduced into the mixer 15 at the rate of 1000 pounds per hour and is mixed with water introduced through the conduit 13 and methane introduced through the conduit 14 to form an aqueous slurry of bituminous sand containing 25 wt. percent water, 8.7 wt. percent bitumen and 66.3 wt. percent solids and containing in addition, 0.5 wt. percent methane based upon the amount of bitumen present in the slurry. The slurry in the mixer 15 is formed at a temperature of 150° F. and at atmospheric pressure and air is excluded from the mixer so that the slurry is formed entirely in the presence of the hydrocarbon atmosphere and hydrocarbon gas rather than air is the effective flotation gas in the separating tank 21. Air is likewise excluded from subsequent contact with the slurry.

From the mixer, the slurry is passed to the flood cell 17 wherein additional water is added to raise the water content of the slurry to 40 wt. percent. The flooded slurry is then passed to a body of hot water in the separating tank 21. This body of water is maintained at a temperature of 150° F. In the separating tank 21 the separation of bitumen from the solids in the slurry is accomplished by the flotation of bitumen to the top of the body of water in the form of a bituminous emulsion recovered as through a conduit 22. The emulsion thus recovered from the separating tank contains 65 wt. percent bitumen, 30 wt. percent water, 5 wt. percent solids and includes in addition 0.5 wt. percent methane based upon the amount of bitumen present in the emulsion.

In this example, no water is added to the conduit 24 or removed through the conduit 26 and the tailings are removed through the conduit 23 containing 75.5 wt. percent solids, 24.0 wt. percent water and 0.5 wt. percent bitumen.

The remainder of the methane not forming a part of or entrained with the emulsion removed through the conduit 22 is collected and removed through the conduit 27 from which it is recycled together with fresh makeup methane through the conduit 14 for reuse in the mixer 15.

While the invention has been described above with reference to certain preferred embodiments thereof, it will be understood by those skilled in the art that various changes and modifications may be made wtihout departing from the spirit and scope of the invention and it is intended to cover all such changes and modifications in the appended claims.

I claim:

1. In a process for the recovery of bitumen from bituminous sand containing same in which a fluid slurry of bituminous sand is introduced into a body of water for separation of bitumen therefrom, the improvement which comprises initially forming such slurry in a gaseous hydrocarbon atmosphere, whereby hydrocarbon gas is entrained in the slurry.

2. The process of claim 1 in which the gaseous hydrocarbon atmosphere contains at least about 70 volume percent hydrocarbon gas and less than 5 volume percent oxygen.

3. The process of claim 1 in which the slurry is maintained in a gaseous hydrocarbon atmosphere continuously from its initial formation until it is introduced into the body of water for separation of bitumen therefrom.

4. The process of claim 1 in which the gaseous hydrocarbon atmosphere is maintained at a pressure between about 1 and about 2 atmospheres.

5. The process of claim 1 in which the pressure on the body of water is maintained between about 0 and about 20 p.s.i. below the pressure of the gaseous hydrocarbon atmosphere in which the initial slurrying takes place.

6. The process of claim 1 in which the amount of gaseous hydrocarbon in the slurry when the slurry is introduced into the body of water is between about 0.005 and about 5 wt. percent based upon the amount of bitumen in the slurry.

7. The process of claim 1 in which the slurry is an aqueous slurry containing at least about 15 wt. percent water.

References Cited
UNITED STATES PATENTS

| | | | |
|---|---|---|---|
| 2,965,557 | 12/1960 | Price | 208—11 |
| 3,050,289 | 8/1962 | Gerner | 208—11 |
| 3,203,888 | 8/1965 | Butler et al. | 208—11 |

CURTIS R. DAVIS, Primary Examiner